(12) United States Patent
Stockwell

(10) Patent No.: US 7,678,735 B2
(45) Date of Patent: Mar. 16, 2010

(54) FCC ADDITIVE FOR PARTIAL AND FULL BURN NOX CONTROL

(75) Inventor: David Matheson Stockwell, Westfield, NJ (US)

(73) Assignee: Engelhard Corporation, Iselin, NJ (US)

( * ) Notice: Subject to any disclaimer, the term of this patent is extended or adjusted under 35 U.S.C. 154(b) by 866 days.

(21) Appl. No.: 11/287,946

(22) Filed: Nov. 28, 2005

(65) Prior Publication Data

US 2007/0123417 A1    May 31, 2007

(51) Int. Cl.
*B01J 23/745* (2006.01)
*B01J 29/90* (2006.01)
*B01J 38/00* (2006.01)

(52) U.S. Cl. .................... 502/338; 502/331; 502/20

(58) Field of Classification Search ............... 502/331, 502/338, 20
See application file for complete search history.

(56) References Cited

U.S. PATENT DOCUMENTS

| | | | | |
|---|---|---|---|---|
| 3,445,521 A | | 5/1969 | Callahan et al. | |
| 3,911,089 A | * | 10/1975 | Shiraishi et al. | 423/376 |
| 4,461,752 A | * | 7/1984 | Sasaki et al. | 423/376 |
| 4,489,169 A | | 12/1984 | Bertus et al. | |
| 4,504,599 A | * | 3/1985 | Sasaki et al. | 502/304 |
| 4,617,175 A | | 10/1986 | Tolpin et al. | |
| 4,873,215 A | * | 10/1989 | Brazdil et al. | 502/202 |
| 4,988,432 A | | 1/1991 | Chin | |
| 5,134,105 A | * | 7/1992 | Paparizos et al. | 502/205 |
| 5,498,588 A | | 3/1996 | Brazdil et al. | |
| 6,238,574 B1 | * | 5/2001 | Cesa et al. | 210/763 |
| 2004/0102642 A1 | * | 5/2004 | Brazdil et al. | 558/325 |
| 2004/0220434 A1 | * | 11/2004 | Brophy et al. | 568/959 |

FOREIGN PATENT DOCUMENTS

| | | |
|---|---|---|
| GB | 2 009 613 | 6/1979 |
| GB | 1 575 018 | 9/1980 |
| WO | WO 2005/005578 | 1/2005 |
| WO | WO 2005/047429 | 5/2005 |

* cited by examiner

*Primary Examiner*—Timothy C Vanoy
*Assistant Examiner*—Daniel Berns
(74) *Attorney, Agent, or Firm*—Raymond F. Keller

(57) ABSTRACT

Ammoxidation catalysts have been found effective for the reduction of emissions of NOx and NOx precursors during FCC catalyst regeneration.

19 Claims, No Drawings

US 7,678,735 B2

FCC ADDITIVE FOR PARTIAL AND FULL BURN NOX CONTROL

FIELD OF THE INVENTION

The present invention relates to a novel catalytic composition for reducing NOx and NOx precursor emissions from a partial and a full burn fluidized catalytic cracking regenerator.

BACKGROUND OF THE INVENTION

A major industrial problem involves the development of efficient methods for reducing the concentration of air pollutants, such as carbon monoxide, sulfur oxides and nitrogen oxides in waste gas streams from the processing and combustion of sulfur, carbon and nitrogen containing fuels. The discharge of these waste gas streams into the atmosphere is environmentally undesirable at the sulfur oxide, carbon monoxide and nitrogen oxide concentrations that are frequently encountered in conventional operations. The regeneration of cracking catalyst, which has been deactivated by coke deposits in the catalytic cracking of sulfur and nitrogen containing hydrocarbons, is a typical example of a process which can result in a waste gas stream containing relatively high levels of carbon monoxide, sulfur and nitrogen oxides.

Catalytic cracking of heavy petroleum fractions is one of the major refining operations employed in the conversion of crude petroleum oils to useful products such as the fuels utilized by internal combustion engines. In fluidized catalytic cracking (FCC) processes, high molecular weight hydrocarbon liquids and vapors are contacted with hot, finely-divided, solid catalyst particles, either in a fluidized bed reactor or in an elongated transfer line reactor, and maintained at an elevated temperature in a fluidized or dispersed state for a period of time sufficient to effect the desired degree of cracking to lower molecular weight hydrocarbons of the kind typically present in motor gasoline and distillate fuels.

In the catalytic cracking of hydrocarbons, some nonvolatile carbonaceous material or coke is deposited on the catalyst particles. Coke comprises highly condensed aromatic hydrocarbons. When the hydrocarbon feedstock contains organic sulfur and nitrogen compounds, the coke also contains sulfur and nitrogen. As coke accumulates on the cracking catalyst, the activity of the catalyst for cracking and the selectivity of the catalyst for producing gasoline blending stocks diminishes. Catalyst which has become substantially deactivated through the deposit of coke is continuously withdrawn from the reaction zone. This deactivated catalyst is conveyed to a stripping zone where volatile deposits are removed with an inert gas at elevated temperatures. The catalyst particles are then reactivated to essentially their original capabilities by substantial removal of the coke deposits in a suitable regeneration process. Regenerated catalyst is then continuously returned to the reaction zone to repeat the cycle.

Catalyst regeneration is accomplished by burning the coke deposits from the catalyst surfaces with an oxygen containing gas, such as air. The combustion of these coke deposits can be regarded, in a simplified manner, as the oxidation of carbon. The products from such combustion are carbon monoxide and carbon dioxide.

The waste gas stream from the combustion process is called flue gas. High residual concentrations of carbon monoxide in flue gases from regenerators have been a problem since the inception of catalytic cracking processes. The evolution of FCC has resulted in the use of increasingly high temperatures in FCC regenerators in order to achieve the required low carbon levels in the regenerated catalysts. Typically, present day regenerators now operate at temperatures in the range of about 1100° F. to 1400° F. When no promoter is used, the flue gases may have a $CO_2/CO$ ratio in the range of 36, or higher in a full burn unit, to 0.5. The oxidation of carbon monoxide is highly exothermic and can result in so-called carbon monoxide "afterburning" which can take place in the dilute catalyst phase, in the cyclones or in the flue gas lines. Afterburning has caused significant damage to plant equipment. On the other hand, unburned carbon monoxide in atmosphere-vented flue gases represents a loss of fuel value and is ecologically undesirable.

Restrictions on the amount of carbon monoxide, which can be exhausted into the atmosphere and the process advantages resulting from more complete oxidation of carbon monoxide, have stimulated several approaches to the provision of means for achieving complete combustion, also known as "full burn," of carbon monoxide in the regenerator.

Among the procedures suggested for use in obtaining complete carbon monoxide combustion in an FCC regeneration have been: (1) increasing the amount of oxygen introduced into the regenerator relative to standard regeneration; and either (2) increasing the average operating temperature in the regenerator or (3) including various carbon monoxide oxidation promoters in the cracking catalyst to promote carbon monoxide burning. Various solutions have also been suggested for the problem of afterburning of carbon monoxide, such as addition of extraneous combustibles or use of water or heat-accepting solids to absorb the heat of combustion of carbon monoxide.

Specific examples of treatments applied to regeneration operated in the complete combustion mode include the addition of a CO combustion promoter metal to the catalyst or to the regenerator. For example, U.S. Pat. No. 2,647,860 proposed adding 0.1 to 1 weight percent chromic oxide to a cracking catalyst to promote combustion of CO. U.S. Pat. No. 3,808,121 taught using relatively large-sized particles containing CO combustion-promoting metal into a regenerator. The small-sized catalyst is cycled between the cracking reactor and the catalyst regenerator while the combustion-promoting particles remain in the regenerator. U.S. Pat. Nos. 4,072,600 and 4,093,535 teach the use of Pt, Pd, Ir, Rh, Os, Ru, and Re in cracking catalysts in concentrations of 0.01 to 50 ppm, based on total catalyst inventory to promote CO combustion in a complete burn unit.

The use of precious metals to catalyze oxidation of carbon monoxide in the regenerators of FCC units has gained broad commercial acceptance. Some of the history of this development is set forth in U.S. Pat. No. 4,171,286 and U.S. Pat. No. 4,222,856. In the earlier stages of the development, the precious metal was deposited on the particles of cracking catalyst. Present practice is generally to supply a promoter in the form of solid fluidizable particles containing a precious metal, such particles being physically separate from the particles of cracking catalyst. The precious metal, or compound thereof, is supported on particles of suitable support carrier material and the promoter particles are usually introduced into the regenerator separately from the particles of cracking catalyst. The particles of promoter are not removed from the system as fines and are cocirculated with cracking catalyst particles during the cracking/stripping/regeneration cycles.

Judgment of the CO combustion efficiency of a promoter is done by the ability to control the difference in temperature, $\Delta T$, between the (hotter) dilute phase, cyclones or flue gas line, and the dense phase. Most FCC units had used a Pt CO combustion promoter, but very recently non-Pt promoters, mainly based on Pd, have seen wider use.

Promoter products used on a commercial basis in FCC units include a support carrier material of calcined spray dried porous microspheres of kaolin clay impregnated with a small amount (e.g., 100 to 1500 ppm) of platinum. Most commercially used promoters are obtained by impregnating a source of platinum on microspheres of high purity porous alumina, typically gamma alumina. The selection of platinum as the precious metal in various commercial products appears to reflect a preference for this metal that is consistent with prior art disclosures that platinum is the most effective group VIII metal for carbon monoxide oxidation promotion in FCC regenerators. See, for example, FIG. 3 in U.S. Pat. No. 4,107,032 and the same figure in U.S. Pat. No. 4,350,614. The figure illustrates the effect of increasing the concentration of various species of precious metal promoters from 0.5 to 10 ppm on $CO_2/CO$ ratio.

U.S. Pat. No. 4,608,357 teaches that palladium is unusually effective in promoting the oxidation of carbon monoxide to carbon dioxide under conditions such as those that prevail in the regenerators of FCC units when the palladium is supported on particles of a specific form of silica-alumina, namely leached mullite. The palladium may be the sole catalytically active metal component of the promoter or it may be mixed with other metals such as platinum.

U.S. Pat. Nos. 5,164,072 and 5,110,780, relate to an FCC CO promoter having Pt on La-stabilized alumina, preferably about 4-8 weight percent $La_2O_3$. It is disclosed that ceria "must be excluded." At col. 3, it is disclosed that "In the presence of an adequate amount of $La_2O_3$, say about 6-8 percent, 2 percent Ce is useless. It is actually harmful if the $La_2O_3$ is less." In an illustrative example, the cited patents demonstrate an adverse effect of 8% Ce on CO promotion of platinum supported on a gamma alumina and a positive effect of La.

While the use of combustion promoters, such as platinum, reduces CO emissions, such reduction in CO emissions is usually accompanied by an undesirable effect—an increase in nitrogen oxides (NOx) in the regenerator flue gas. The more active combustion promoters such as platinum and palladium also serve to promote the formation of nitrogen oxides in the regeneration zone. It has been reported that the use of prior art CO promoters can cause a dramatic increase (e.g. >300%) in NOx. It is difficult in a catalyst regenerator to completely burn coke and CO without increasing the NOx content of the regenerator flue gas. Since the discharge of nitrogen oxides into the atmosphere is environmentally undesirable and strictly regulated, the use of these promoters has the effect of substituting one undesirable emission for another. In response to environmental concerns, much effort has been spent on finding ways to reduce NOx emissions.

Various approaches have been used to either reduce the formation of NOx or to treat them after they are formed. Most typically, additives have been used either as an integral part of the FCC catalyst particles or as separate particles in admixture with the FCC catalyst.

Various additives have been developed that will carry out CO promotion while controlling NOx emissions.

U.S. Pat. Nos. 4,350,614, 4,072,600 and 4,088,568 disclose rare earth addition to Pt based CO promoters. An example is 4% REO that shows some advantage. There is no teaching of any effect of REO on decreasing NOx emissions from the FCC.

U.S. Pat. No. 4,199,435 teaches a combustion promoter selected from the Pt, Pd, Ir, Os, Ru, Rh, Re and copper on an inorganic support.

U.S. Pat. No. 4,290,878 teaches a Pt—Ir and Pt—Rh bimetallic promoter that reduces NOx compared to conventional Pt promoter.

U.S. Pat. No. 4,300,997 patent teaches the use of a Pd—Ru promoter for oxidation of CO that does not cause excessive NOx formation.

U.S. Pat. No. 4,544,645 describes a bimetallic of Pd with every other Group VIII metal but Ru.

U.S. Pat. Nos. 6,165,933 and 6,358,881 describe compositions comprising a component containing (i) an acidic oxide support, (ii) an alkali metal and/or alkaline earth metal or mixtures thereof, (iii) a transition metal oxide having oxygen storage capability, and (iv) palladium; to promote CO combustion in FCC processes while minimizing the formation of NOx.

U.S. Pat. No. 6,117,813 teaches a CO promoter consisting of a Group VIII transition metal oxide, Group IIIB transition metal oxide and Group IIA metal oxide.

As opposed to complete CO combustion, FCC catalyst regenerators may be operated in an incomplete mode of combustion, and these are commonly called "partial burn" units. Incomplete CO combustion leaves a relatively large amount of coke on the regenerated catalyst which is passed from an FCC regeneration zone to an FCC reaction zone. The relative content of CO in the regenerator flue gas is relatively high, i.e., about 1 to 10 volume percent. A key feature of partial combustion mode FCC is that the heat effect of coke burning per weight of coke is reduced because the exothermic CO combustion reaction is suppressed. This enables higher throughput of oil and lower regenerator temperatures, and preservation of these benefits is essential to the economics of the FCC process. Under incomplete combustion operation NOx may not be observed in the regenerator flue gas, but sizable amounts of ammonia and HCN are normally present in the flue gas. According to U.S. Pat. No. 4,744,962, the regenerator flue gas formed under incomplete combustion typically comprises about 0.1-0.4% $O_2$, 15% $CO_2$, 4% CO, 12% $H_2O$, 200 ppm $SO_2$, 500 ppm $NH_3$, and 100 ppm HCN. If the ammonia and HCN are allowed to enter a CO boiler, some of the ammonia and HCN may be converted to NOx.

While the prior art has focused on the additives' impact to the formation of NOx in a full burn operations, these known additives are becoming increasingly inadequate when much lower emission standards are developed. Further, these additives have not been demonstrated to be effective in a partial burn operation. In a partial burn operation, the conversion to CO to $CO_2$ is at least constrained and at times to be minimized. It is believed that HCN and $NH_3$ are the primary products of the partial burn combustion of coke during the regeneration process. There is a need to find a new additive that can convert HCN to CO and $NH_3$, and then selectively oxidize to $N_2$ instead of NOx. There is also a need to find new additives in full burn regeneration process to satisfy the increasing higher NOx emission standard.

SUMMARY OF THE INVENTION

The present invention is directed to a catalytic composition for reducing NOx and NOx precursor emissions from a full burn and a partial burn fluidized catalytic cracking regenerator. A metal containing additive composition is provided that has high activity and selectivity for the conversion of $NH_3$, HCN and NOx to $N_2$ when in context with the gas phase in an FCC regenerator. The metal additive composition of the present invention, for example, a FeSb-based composition, functions to lower the final NOx emission in both partial and full burn FCC regenerator operations The present invention also provides a process of using ammoxidation catalysts in the FCC catalyst regeneration operation to reduce NOx emission.

It is an object of the present invention to reduce NOx and NOx precursor emissions in partial burn FCC regenerators while avoiding concurrent CO oxidation.

It is another object of the present invention to reduce NOx and NOx precursor emissions in full burn FCC regenerators.

DETAILED DESCRIPTION OF THE INVENTION

As used herein:

"WPV" denotes the incipient wetness water pore volume of the support;

"ABD" denotes the apparent or fall bulk density of the support;

"BET" denotes the surface area by the Brunauer, Emmett and Teller method, $m^2/g$; and "APS" denotes the average particle size by laser scattering, μm.

The present invention is used in connection with a fluid catalytic cracking process for cracking hydrocarbon feeds. The same hydrocarbon feeds normally processed in commercial FCC systems may be processed in a cracking system employing the present invention. Suitable feedstocks include, for example, petroleum distillates or residuals, either virgin or partially refined. Synthetic feeds such as coal oil and shale oils are also suitable. Suitable feedstocks normally boil in the range from about 200-600° C. or higher. A suitable feed may include recycled hydrocarbons which have already been subjected to cracking.

The catalytic cracking of these petroleum distillates, which are relatively high molecular weight hydrocarbons, results in the production of lower molecular weight hydrocarbon products. The cracking is performed in the catalytic cracking reactor which is separate and distinct from the catalyst regeneration zone. The cracking is performed in a manner in cyclical communication with a catalyst regeneration zone, commonly called a regenerator. Catalysts suitable in this type of catalytic cracking system include siliceous inorganic oxides, such as silica, alumina, or silica-containing cracking catalysts. The catalyst may, for example, be a conventional non-zeolitic cracking catalyst containing at least one porous inorganic oxide, such as silica, alumina, magnesia, zirconia, etc., or a mixture of silica and alumina or silica and magnesia, etc., or a natural or synthetic clay. The catalyst may also be a conventional zeolite-containing cracking catalyst including a crystalline aluminosilicate zeolite associated with a porous refractory matrix which may be silica-alumina, clay, or the like. The matrix generally constitutes 50-95 weight percent of the cracking catalyst, with the remaining 5-50 weight percent being a zeolite component dispersed on or embedded in the matrix. The zeolite may be rare earth-exchanged, e.g., 0.1 to 10 wt % RE, or hydrogen-exchanged. Conventional zeolite-containing cracking catalysts often include an X-type zeolite or a Y-type zeolite. Low (less than 1%) sodium content Y-type zeolites are particularly useful. All zeolite contents discussed herein refer to the zeolite content of the makeup catalyst, rather than the zeolite content of the equilibrium catalyst, or E-Cat. Much crystallinity is lost in the weeks and months that the catalyst spends in the harsh, steam filled environment of modern FCC regenerators, so the equilibrium catalyst will contain a much lower zeolite content by classical analytic methods. Most refiners usually refer to the zeolite content of their makeup catalyst. As will be apparent to those skilled in the art, the composition of the catalyst particles employed in the system is not a critical feature of the present method and, accordingly any known or useful catalyst is acceptable in this invention.

The catalyst inventory may contain one or more additives present as separate additive particles or mixed in with each particle of the cracking catalyst. Additives are sometimes used to enhance octane (medium pore size zeolites, sometimes referred to as shape selective zeolites, i.e., those having a Constraint Index of 1-12, and typified by ZSM-5, and other materials having a similar crystal structure).

It is desirable to separate the hydrocarbon products from the catalyst immediately after cracking. For this reason, a stripping zone is usually placed intermediate to the cracking reactor and the regenerator to cause quick or rapid disengagement of the hydrocarbon products from the catalyst. The stripping zone is maintained at a temperature of about 300° C. to about 600° C. and usually has an inert gas such as steam or nitrogen to aid the stripping.

The cracking conditions generally employed during the conversion of the higher molecular weight hydrocarbons to lower molecular weight hydrocarbons include a temperature of from about 425° C. to about 600° C. The average amount of coke deposited on the surface of the catalyst is between 0.5 weight percent and 2.5 weight percent depending on the composition of the feed material. Rapid disengagement after cracking is again achieved via the stripping zone. Again, conditions for cracking may vary depending on the refiner, feed composition, and products desired. The particular cracking parameters are not critical to the present invention which contemplates successful removal of NOx, $NH_3$ and HCN from the regenerator over a widely varying range of cracking conditions.

Catalyst passed from the stripping zone to the catalyst regeneration zone will undergo regeneration in the presence of oxygen in the catalyst regeneration zone. This zone usually includes a lower dense bed of catalyst having a temperature of about 500° C. to 750° C. and a surmounted dilute phase of catalyst having a temperature of from about 500° C. to about 800° C. In order to remove the coke from the catalyst, oxygen is supplied in a stoichiometric or substoichiometric relationship to the coke on the spent catalyst. This oxygen may be added by means of any suitable sparging device in the bottom of the regeneration zone or, if desired, additional oxygen can be added in the dilute phase of the regeneration zone surmounted to the dense phase of catalyst. In this invention, either a stoichimetric quantity of oxygen to operate the regeneration zone in a complete combustion mode, or full-burn mode can be used, as is currently in fashion in many FCC units, or the regeneration zone can be operated in a standard mode of operation which comprises a partial combustion mode, or partial burn, or sometimes referred to as a reducing mode wherein the quantity of carbon monoxide in the regeneration zone is maintained at a level of from about 1 to 10 percent by volume of the regenerator flue gas.

Although most regenerators are controlled primarily by adjusting the amount of regeneration air added, other equivalent control schemes are available which keep the air constant and change some other condition. Constant air rate, with changes in feed rate changing the coke yield, is an acceptable way to modify regenerator operation. Constant air, with variable feed preheat, or variable regenerator air preheat, are also acceptable. Finally, catalyst coolers can be used to remove heat from a unit. If a unit is not generating enough coke to stay in heat balance, torch oil, or some other fuel may be burned in the regenerator.

When the regeneration zone is operated in a mode of partial burn, the off gas stream contains a sizable amount of ammonia ($NH_3$) and HCN. The amount of ammonia, for example, may range from about 10 parts per million to 1000 parts per million, depending on the composition of the feed material. After requisite separation from the regenerated catalyst, the flue gas stream is passed to a CO boiler where CO is converted to $CO_2$ in the presence of oxygen. If the ammonia and HCN are allowed to enter the CO boiler, a portion or all of it may become converted to a NOx during the CO oxidation to $CO_2$.

In accordance with one embodiment of the present invention, a metal additive is provided in the regenerator to remove the ammonia and HCN gas which is formed so as to prevent the formation of NOx in the downstream CO boiler. In this embodiment, the additive of the present invention is particularly useful in regeneration units which are run under partial combustion conditions.

It has now been found that many ammoxidation catalysts may be used as a metal additive in an FCC catalyst regeneration operation to reduce the emission of NOx, and the precursors thereof. The present invention is directed to providing a catalyst composition comprising an ammoxidation catalyst as the metal additive on a support carrier, and use thereof in reducing NOx and NOx precursor emissions in the fuel gas of an FCC regenerator.

Ammoxidation catalysts are used in an ammoxidation process to make nitriles from olefins and ammonia as follows:

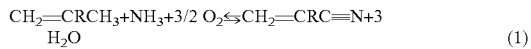

$$CH_2=CRCH_3 + NH_3 + 3/2\ O_2 \leftrightarrows CH_2=CRC\equiv N + 3 H_2O \quad (1)$$

Propylene is the typical hydrocarbon feed but isobutylene, substituted aromatics, alkanes and substituted hydrocarbons have also been used. Ammoxidation temperatures are generally between 400° and 500° C. with air as feed. Pressures are 1.5-3 bar in a fluid bed process using a fluidized catalyst particle size between 40 and 100 um, similar to FCC. It was initially suspected that the same catalysts which make carbon-nitrogen triple bonds from ammonia and a carbon source could catalyze the reverse hydrolysis reaction as well. By analogy, these catalysts might then be able to hydrolyze the carbon-nitrogen triple bond in HCN at the high temperature and under the environment of a fluid bed FCC regenerator. This follows if the hydrolysis of HCN to $NH_3$ and CO by water is considered to be the simplest form of that type of reaction.

$$HC\equiv N + H_2O \leftrightarrows NH_3 + CO \quad (2)$$

Desirably, $NH_3$ is then selectively oxidized to $N_2$, in the regenerator hence avoiding the un-desirable production of NOx.

The results of our investigations indicate that this hydrolysis reaction (2) is often easy to achieve but the subsequent selective oxidation of $NH_3$ to $N_2$ is a more difficult step. Importantly, the oxidation of $NH_3$ to $N_2$ is desired in order to reduce NOx emission in the present invention. In a typical ammoxidation process, however, the oxidation of $NH_3$ to $N_2$ is to be avoided. That high yields of $N_2$ can be formed during FCC regeneration from catalysts normally tuned to eliminate $N_2$ production in ammoxidation processing is surprising.

A. Metal additive

There are many known ammoxidation catalysts. An example of a useful review of the art of ammoxidation catalysts can be found in the chapter by R. K. Grasselli in the Handbook of Heterogeneous Catalysis which was published in 1997 by Wiley-VCH, Weinheim. Such catalysts useful in this invention may include complex mixed metal molybdates or antimonates where metal-oxygen bond strengths have been optimized to give the required selectivity. According to Grasselli, this optimization provides lattice oxygen which is more selective oxidant than molecular oxygen. A Bi—Mo system is a known ammoxidation catalyst. The multicomponent Bi—Mo complex may also contain redox elements such as Fe, Ce, and Cr with reduction potentials below Bi, whose role is to dissociate and be oxidized by molecular oxygen, and to continually reoxidize the Bi—Mo that had been reduced during ammoxidation. Thus the role of these redox elements is essential to obtain high activity and selectivity. Further known promoters include Ni, Co, Mg, and/or Mn according to Grasselli. The first commercialized catalysts were phosphomolybdates employing promoters of Cu, Sn, Sb and Bi and later contained K, Fe, Ni, Co, Cs, Mn, Mg, Cr, these recipes comprising five generations of improvements in the Bi—Mo system. Successful antimonite catalysts have contained at least one of the redox couples $Fe^{2+/3+}$, $Ce^{3+/4+}$, $Cr^{2+/3+}$, $U^{5+/6+}$, or Sn, V, or Mn, whose role once again is to make lattice oxygen from $O_2$ and then replenish the $Sb^{3+/5+}$ active sites with this lattice oxygen, each of which is further improved by the addition of certain selected elements. These promoters include many variations of Na, Cu, Mg, Zn, Ni, V, W, Te, Mo. While many permutations are possible, the formulations which are optimized for ammoxidation reactions are quite specific, as noted in the ammoxidation catalyst art. Not all superior ammoxidation catalysts may find applicability in the present invention. For instance, while BiMoOx is a superior ammoxidation catalyst according to Grasselli, Bi is a liquid and Mo is a vapor at FCC conditions. Therefore, BiMoOx may not be readily incorporated or stable in an FCC regenerator. One of ordinary skill in the art of this invention can readily evaluate known ammoxidation catalysts for the usefulness thereof under FCC regeneration conditions.

The Grasselli review describes precipitated Fe—Sb based catalysts composited with colloidal $SiO_2$ which have good activity and selectivity in the fluid bed ammoxidation process. As noted, transition and other third and perhaps fourth elements are added to alter or improve the catalytic results. The ratios of Fe to Sb and the promoter may be significant to the results, although the volatilization and loss of Sb from the catalyst and process apparently has an equalizing influence on catalysts containing more than a certain minimum of Sb. Excess Sb in the catalyst or live addition of Sb during operation is used to maintain the minimum Sb content during ammoxidation.

Generally, a metal additive of a FeSbM system has been found effective in the present invention. M, an optional promoter, can be a metal, including but not limited to Mg, Mn, Mo, Ni, Sn, V or Cu. In a preferred embodiment, M is Cu. It has been found that a tertiary combination of FeSbM is more effective in reducing NOx and NOx precursors than binary combinations of Fe, Sb and M at the same loadings. The atomic ratio of Fe to Sb to Cu may be 0.1-10 to 0.1-10 to 0-10, respectively. The preferred ratio is 0.5-2 to 1-5 to 0.5-2 and the most preferred ratio is 1 to 2.5 to 1. Generally, the metals will be present at about 5-15 wt % total loading as the metal oxides on a separately prepared support material. Preferably, the metal additive is present in the amounts of about 8-12 wt % as oxides of total weight of the composition and more preferably about 10 wt %. At 10 wt % as oxides, this amounts to about 1.5 wt % of $Fe_2O_3$, 1.5 wt % of CuO, and 7 wt % $Sb_2O_4$, for the most preferred embodiment. As a contrast, it is to be noted that a typical ammoxidation catalyst contains over 40 wt %, even up to 80 wt. % active metal oxide B. Support Carrier Many carrier support materials may be used to carry the metal additive composition of the present invention. For example, such carrier support materials may include: (i) in situ FCC containing zeolites, (ii) calcined kaolins (iii) alumina or (iv) silica. If silica is used, zirconium can be added to provide thermal stability. A Zr-stabilized silica support carrier has been found useful. Other known metal oxide support carriers may be used.

C. Preparation of the Composition of the Present Invention

Catalysts containing the FeSbM system may be prepared as follows. Carrier microspheres can be first impregnated with co-dissolved solutions of iron nitrate-antimony chloride, which solutions also contain the dissolved salts of any acidic metal elements. It is useful to design the impregnation to fill only a portion of the pore volume of the carrier microsphere. The remaining portion of the pore volume can then be filled with concentrated ammonium hydroxide solution. The amount of the ammonium used is generally equal to the equivalents of the nitrates plus chlorides. This provides a neutral pH and the precipitation of the dissolved metals inside the microspheres at incipient wetness volume. Obviously, for other metal ammoxidation catalysts, different salts may be used, although the procedure can be followed.

The entrained ammonium nitrate salts can be explosive if dried. Therefore, the impregnated microspheres should be allowed to react for about 30 minutes, then slurried with deionized water, filtered and washed to remove the salts, leaving the FeSbM hydrogels in the microspheres. The hydroxide mixture can then be calcined. If basic promoter metals are used, the promoter can be combined with the ammonium solution in the second impregnation, the overall equivalents being adjusted to provide neutrality after both the acidic and basic solutions are impregnated.

D. Application

The metal additive of the present invention may be added to the FCC unit via an additive loader in the same manner as CO promoters and other additives. Alternatively, the additive of the invention may be pre-blended with the fresh FCC catalyst being supplied to the FCC unit. Preferably, the metal additive composition of the present invention is used with the conventional FCC catalysts at a dose of about less than 10%, preferably less than 5%, and more preferably about 2% of the regenerated FCC catalyst additions. Thus, the additive can be circulated between the riser and regenerator of the FCC unit with the working catalyst.

The $NO_x$ reduction composition may be used as a separate additive particle or as an integral part of an FCC catalyst particle. If used as an additive, the $NO_x$, reduction component may itself be formed into particles suitable for use in a FCC process. Alternatively, the $NO_x$ reduction component may be combined with binders, fillers, etc. by any conventional technique. See for example, the process described in U.S. Pat. No. 5,194,413, the disclosure of which is incorporated herein by reference.

Where the $NO_x$ reduction additive of the invention is integrated into an FCC catalyst particle, preferably the metal additive component is first formed and then combined with the other constituents which make up the FCC catalyst particle. Incorporation of the $NO_x$ reduction composition directly into FCC catalyst particles may be accomplished by any known technique. Examples of suitable techniques for this purpose are disclosed in U.S. Pat. Nos. 3,957,689; 4,499,197; 4,542,188 and 4,458,623, the disclosures of which are incorporated herein by reference.

Without further elaboration, it is believed that one skilled in the art can, using the preceding description, utilize the present invention to its fullest extent.

The following specific embodiments are, therefore, to be construed as merely illustrative, and not limitative of the remainder of the disclosure in any way whatsoever. In the following examples, all parts and percentages were by weight, unless otherwise indicated.

EXAMPLE 1

$Fe_1Sb_{2.5}Cu_1$ on Zr-stabilized Silica-clay Microspheres

The support carrier material was prepared as follows. 35 parts of precipitated $SiO_2$ powder, 45 parts of ASP-200® hydrous kaolin from Engelhard Corporation, and 20 parts of $SiO_2$ in the form of Ludox® HS40 colloidal silica was blended in a Cowles mixer at 40% solids and pH>9, with the final slurry mixed 2 hours at pH=10.6 by use of ammonium hydroxide. This was then spray dried, ammonium exchanged once using 1:1 by weight catalyst: 54 wt % $NH_4NO_3$ solution in water at pH=3 and 180° F., filtered and washed, dried and calcined at 1400° F. for 2 hours in open trays. BET surface area was 155 $m_2$/gM, $Na_2O$=0.16 wt %, $Al_2O_3$=19 wt %, $Fe_2O_3$=0.42 wt %, APS=125 µm.

This support carrier material was then impregnated with zirconyl nitrate targeting 2% $ZrO_2$ by the incipient wetness method and then calcined 1400° F. for 2 hours. Analysis of the prepared support material showed 1.7 wt % of $ZrO_2$ and BET was 136 $m^2$/gM.

To prepare the metal additive system, 30 grams of the Zr-stabilized support was impregnated with a mixed solution of Fe, Sb, and Cu salts. 2.48 grams of $Fe(NO_3)_3.9H_2O$ and 3.50 grams of $SbCl_3$ and 1.43 grams of $Cu(NO_3)_2.2.5H_2O$ were dissolved in water to form a fully dissolved solution which was greater than half the pore volume of the support. Separately, 7.29 grams of 28 wt % $NH_4OH$ was diluted to a volume such that the volumes of the two solutions were an integral multiple of the support pore volume of 30 grams of support. The support was impregnated with the FeSbCu solution to fill about half the pore volume of the support and the balance of the pore volume was filled with ammonium hydroxide solution. Generally, two passes of the impregnation steps may be needed although more may be used. 30 minutes of reaction time were allowed for the impregnated materials, and then the materials were slurried at pH=8, filtered, and washed with water at pH=8. The washed material was then dried, and if necessary, impregnated again until all of each solution was used.

The materials were then calcined for 24 hours at 800° F. and then 8 hours at 1400° F.

EXAMPLES 2 AND 3

Fe/Sb/Mg and Fe/Sb/Mn

Two other samples were made using $Mg(NO_3)_2.6H_2O$ and $Mn(NO_3)_2.H_2O$ salts at the atomic ratios $Fe_1Sb_{2.5}Mg_{0.35}$ and $Fe_{0.5}Sb_{2.5}Mn_{0.5}$. The $Zr/SiO_2$ and clay support were prepared in the same manner as in Example 1. The detailed components of Examples 2 and 3 are listed below:

|  | Example | |
| --- | --- | --- |
|  | 2 | 3 |
| Fe/Sb/Mg or Fe/Sb/Mn | 1/2.5/0.35 | 0.5/2.5/0.5 |
| Support Material | $Zr/SiO_2$ + Clay | $Zr/SiO_2$ + Clay |
| Grams of Support | 50 | 50 |
| Total MO$x$ Loading, wt % | 10 | 10 |

-continued

| | Example | |
|---|---|---|
| | 2 | 3 |
| Wt % Loading Fe$_2$O$_3$ | 1.67 | 0.85 |
| Salt Formula | Fe(NO$_3$)$_3$•9H$_2$O | Fe(NO$_3$)$_3$•9H$_2$O |
| Grams Salt | 4.69 | 2.40 |
| Wt % Loading Sb$_2$O$_4$ | 8.04 | 8.22 |
| Salt Formula | SbCl$_3$ | SbCl$_3$ |
| Grams Salt | 6.6 | 6.8 |
| Wt % MgO or Mn$_2$O$_4$ | 0.29 | 0.93 |
| Salt Formula | Mg(NO$_3$)$_2$•6H$_2$O | Mn(NO$_3$)$_2$•H$_2$O |
| Grams Salt | 1.0 | 1.1 |
| Grams 28% NH$_4$OH used | 16.3 | 14.9 |

Blends containing 20% of the metal additives of the present invention and 80% of a standard zeolitic FCC catalyst were made and steamed at 1500° F. for 2 hours. This steamed blend was then blended as 50% steamed additive blend, 40% of steamed FCC catalyst without any additive, and 10% of undiluted fresh additive. Each recombined blend therefore contained 10% steamed additive and 10% un-steamed additive, without any unsteamed zeolitic FCC catalyst. 2 grams of the resulting 50-40-10 blends were then further diluted with 18 grams of steamed FCC catalyst, and placed in a fluidized bed test apparatus with the reaction zone at 1300° F. Test gases which contained representative amounts of CO$_2$, CO, H$_2$O, O$_2$, SO$_2$, NO, HCN, NH$_3$ and inert diluent were admitted to the catalyst mixtures in the reactor at a space velocity with respect to the additive which was representative of an FCC regenerator operating with an equilibrium catalyst (E-cat) containing 2% additive. After about 30-60 minutes on stream, the effluent of the reactor was analyzed and the molar yields are collected in Table 1.

A blank run made with 20 grams of steamed FCC catalyst microspheres gave 1812 μmol CO$_2$ and 1494 μmol CO, consistent with a partial combustion process, as well as 14.2 μmol of HCN, 22.6 μmol of NH$_3$, 3.1 μmol NOx, 0.1 μmol N$_2$O, and (91/2) μmol of N$_2$, where in the latter case twice the amount determined was reported in Table 1 so as to put the N$_2$ yield on a N-atom basis.

Comparative results were also shown for a fully promoted equilibrium catalyst (E-cat) taken from a refinery using an additive containing about 500 ppm of Pt. No other additives were in use. Less CO and much more NOx was made using this Pt material, along with some increase in N$_2$, as expected. The relative rate of CO oxidation, k(COP), was 3.69, but testing under partial burn conditions led to considerable CO yield.

The metal additives of the invention (Examples 1-3) produce more N$_2$ than the comparative test using Pt additive and much less NOx. Example 1 in particular gave 124 μmol of nitrogen atoms out of a total of 131 μmol of nitrogen atoms total, or 95% yield of N$_2$. The other two additives were less active, but the selectivity to NOx was favorably low. The relative CO oxidation activity of these materials was also favorably low, only 0.5% to 2% of the activity of equilibrium CO promoter. The high yields of N$_2$, low yields of NOx and low CO oxidation activity make the metal additives of the present invention useful for partial burn FCC operations.

Two more comparative examples were run that might also be suitable for partial burn operations, having low CO oxidation activity. The first was a 2% copper, 21% rare earth additive based on ceria. This additive was found to be more active than the metal additives of Examples 2 and 3, but had higher selectivity to NOx. A conventional Ce—V—Mg—Al SOx additive was also tested for comparison. It was found that this additive had more activity than the metal additives of Examples 2 and 3, as well as higher selectivity to NOx. The preferred composition of the invention, as illustrated in Example 1, outperforms all of the materials tested in N$_2$ yield and selectivity.

EXAMPLE 4

In this example, the atomic ratio of Fe/Sb/Cu in Example 1 was changed to 1/2.5/0.35. All other components were the same as Example 1. Details of the salts and weights employed in this example are listed in Table 2.

EXAMPLES 5-12

Instead of using CuO as in the above examples, other transition metals were used in Examples 5-12. For instance, MOx was represented by Bi$_2$O$_3$, Ce$_2$O$_3$, CoO, MoO$_3$, NiO, SnO$_2$, V$_2$O$_5$, and ZnO in Examples 5-12, respectively. Details of the salts and weights employed for these examples are listed in Table 2.

EXAMPLES 13-18

In these preparations, Fe/Sb/Cu with atomic ratios of 1/2.5/1 at 10 wt % total metal oxide loading was being applied to various support materials. The methods of preparation of the microspheroidal supports are described below and some of the properties of the support are listed in Tables 3 and 4.

Example 13 employed the SiO$_2$+kaolin support spray dried for Example 1, except that it had been loaded to 9 wt % ZrO$_2$. It was then loaded with FeSbCu. Table 4 lists all of these catalyst preparations. Portions of this prepared material were impregnated with Pt or Pd, but the relative performance of the materials was not improved for NOx.

Example 14 employed microspheres containing only calcined kaolin.

Example 15 employed the FCC catalyst described in U.S. Pat. No. 6,656,347, incorporated herein by reference, with the exception that the material contains 5 wt % REO.

Example 16 employed a microspheroidal alumina sold as "Puralox" by Sasol North America. This microspheroidal support has a fresh surface area of 95 m$^2$/gram.

Example 17 employed a conventional Ce—V-promoted MgAl$_2$O$_4$ spinel SOx additive.

Example 18 employed a support prepared from 57 parts of a 10 wt % WO$_3$/TiO$_2$ SCR support powder that were slurried with 29 parts of hydrous kaolin and 14 parts of Ludox colloidal SiO$_2$, spray dried into microspheres, ion exchanged to remove any contaminants and then calcined at 1400° F. for 2 hours.

EXAMPLES 19-26

Examples 19-26 studied the influence of the total metal oxide loading for Fe/Sb/Cu at the 1/2.5/1 ratio, whether Fe/Sb without a promoter had activity at several ratios, and the roles of the individual metals in the Fe/Sb/Cu system. For the last aspect of the study, either the Fe or the Sb was removed from the base formulation of 1/2.5/1 (at 10% loading) while leaving the wt % loading of the remaining metals unchanged. The high zirconia loading support was used. Table 5 sets forth the details of the catalysts.

EXAMPLES 27-32

Example 27 studied the average of 8 runs of the blank or control experiment where the diluent FCC catalyst was used without any metal additives of the present invention, Table 6.

Example 28 studied the results of another performance test on Example 1, a preferred additive of the present invention. Although NOx was higher than the control, most of the HCN and $NH_3$ were converted to $N_2$, which was formed at 94% yield. There had also been minimal effect on $CO_2/CO$. A typical Pt promoted equilibrium catalyst gives only 76% yield of $N_2$ with the balance being mainly NOx, in addition to high levels of $CO_2$ (Example 28 in Table 6).

Examples 29-32 in Table 6 show that Mo, Ni, Sn, and V—promoted FeSb yield more $N_2$ than no promoters at all, but at least at the loadings of the present process, they were less active than an additive with copper as a promoter.

EXAMPLES 33-38

Examples 33-38 in Table 7 illustrate the performance of the base $Fe_1Sb_{2.5}Cu_1$ formulation on several supports, Example 33 being a repetition of the preparation of Example 1, except for the higher loading of zirconia on the support. The results for $ZrSiO_2$, kaolin and FCC catalyst supports were favorable. NOx yields and CO oxidation were somewhat higher for the alumina support, and significantly higher for the SOx additive and the $W/TiO_2$ SCR support.

EXAMPLES 39-47

Examples 39-47 in Table 8 illustrates results from experiments defining the roles of the different metal oxides and the operable range of the invention.

Example 39 was conducted with the standard 0.4 grams of additive in a 20 gram charge to the fluid bed, but this additive had zero loadings of Fe, Sb, and Cu. The nitrogen yield was only somewhat higher than the control runs cited above, indicating that the FeSbM was essential to obtaining very high $N_2$ yields.

Two tests were conducted on the Example 20 FeSbCu made at 1% loading, but the charge of the additive to the reactor was 10 times higher than normal testing, such that the amount of the FeSbCu oxide in the reactor was the same as in the 10% total MOx loading case of Example 28. Surprisingly, the $N_2$ yield was essentially the same as the blank support where there was no FeSbCu present. The Example 21 material with 3% MOx loading gave the same surprising result. Three ratios of Fe/Sb without any copper likewise showed low $N_2$ yields, but still higher than the control Example 27.

Examples 46 and 47 measured the performance of metal additives at the normal 0.4 grams dosage in the reactor and nominal $Fe_1Sb_{2.5}Cu_1$ formulation, except that either the Sb (Example 46 and 25) or the Fe (Example 47 or 26) had been left out of the preparation. The $N_2$ yield in the no antimony case was reasonable but not as high as when Sb was included, at least in the test results for the original sample, Example 1. There were no obvious selectivity debits for Example 46 and the performance was the nearly the same, even better than the Test 33 of the main FeSbCu recipe on this batch of support. This led to a concern over whether the Sb had a role and whether FeCu itself was valuable and sufficient. Example 33 was repeated, now as Example 48 illustrated next to Example 33 in Table 7. The yield results of Example 48 were comparable to Example 28.

EXAMPLES 49-60

Finally, experiments were run comparing 2% fresh additive and 2% steamed additive against 1% fresh-1% steamed additive blend. Since the refinery operation was complex and all catalysts age with time, these experiments may help indicate how the additives would perform under different commercial scenarios. Catalysts from Examples 13-16 were compared, since these gave favorable results as mixtures. Each contains 10 wt % total loading of 1/2.5/1 Fe/Sb/Cu.

Table 9 lists various test results with regard to Examples 13-16, (Examples 49-60).

Example 13 (9% $ZrO_2$/($SiO_2$+kaolin) support), a preferred embodiment, gave lower NOx and $N_2$, and higher CO for the steamed material, consistent with deactivation without degradation of selectivity.

Example 14 made with kaolin microspheres surprisingly gave high fresh NOx selectivity. If the lifetime of the additive was short, NOx might go up when using this material. If the poor initial selectivity disappears quickly, the initial selectivity may not contribute much overall however. This support material was preferred for its low cost and low interference with cracking reactions.

Example 15, another preferred embodiment of the present invention, made with FCC catalyst as a support had shown good fresh selectivity and activity. Deactivated material also remains selective. This suggests relatively high doses could be added quickly on an FCC unit and the results seen quickly and without complication.

Example 16 made with alumina support shows high fresh NOx selectivity, although steamed NOx selectivity and overall $N_2$ yield was greatly improved. Higher CO conversion was also found, which was not desirable From the foregoing description, one skilled in the art can easily ascertain the essential characteristics of this invention, and without departing from the spirit and scope thereof, can make various changes and modifications of the invention to adapt it to various usages and conditions. For instance, in all examples, the products were dried under vacuum. But the product can also be dried under atmospheric pressure.

TABLE 1

Performance results for the Invention and comparative examples. Yields in μmol of each gas.

|  | Blank | Comparative | Comparative | Comparative | Preparation Example 1 Invention Preferred | 2 Invention | 3 Invention |
|---|---|---|---|---|---|---|---|
| Ratios (wt %) | FCC steamed | Pt E-cat FCC | 2% CuO, 21% REO | SOx additive | 1.5Fe/7.1Sb/1.5Cu | 1.7Fe/8.0Sb/0.3Mg | 0.9Fe/8.0Sb/0.9Mn |
| $CO_2$ | 1812 | 2703 | 2838 | 2198 | 2132 | 1896 | 1904 |
| CO | 1494 | 652 | 368 | 1137 | 1139 | 1387 | 1411 |
| $H_2O$ | 3285 | 3834 | 3055 | 3357 | 3133 | 3248 | 3344 |
| $CO_2$ + CO | 3306 | 3354 | 3206 | 3335 | 3271 | 3283 | 3315 |
| $2*N_2$ | 91 | 100 | 107 | 109 | 124 | 104 | 103 |
| HCN | 14.2 | 3.2 | 0.9 | 5.8 | 0.1 | 6.0 | 6.6 |
| $NH_3$ | 22.6 | 2.8 | 9.5 | 6.1 | 1.0 | 16.6 | 16.9 |
| NO | 1.8 | 24.7 | 11.6 | 8.7 | 4.4 | 3.0 | 3.5 |
| $NO_2$ | 1.3 | 1.3 | 1.1 | 1.2 | 1.1 | 0.9 | 1.0 |
| $N_2O$ | 0.1 | 0.1 | 0.1 | 0.0 | 0.0 | 0.0 | 0.1 |
| Total N | 131 | 132 | 130 | 131 | 131 | 131 | 131 |
| $SO_2$ | 18.0 | 18.7 | 16.4 | 7.2 | 15.2 | 17.8 | 17.9 |
| COS | 0.0 | 0.1 | 0.0 | 0.0 | 0.0 | 0.0 | 0.3 |
| k(COP) | — | 3.69 | — | 0.09 | 0.07 | 0.03 | 0.02 |

TABLE 2

Details for Examples 4-12.

| | Example 4 | 5 | 6 | 7 | 8 |
|---|---|---|---|---|---|
| Promoter MOx | CuO | Bi2O3 | Ce2O3 | CoO | MoO3 |
| Metal Atom mole Ratios Fe/Sb/M | 1/2.5/0.35 | 1/2.5/0.35 | 0.5/2.5/0.5 | 1/2.5/0.35 | 1/2.5/0.35 |
| Support | 2% ZrO2/(SiO2 + kaolin) | | | | |
| WPV of support, ml/g | 0.6 | | | | |
| Grams of Support | 30 | 30 | 50 | 50 | 30 |
| Total MOx Loading, wt % | 10 | | | | |
| Fe2O3, wt % | 1.62 | 1.46 | 0.78 | 1.63 | 0.89 |
| Fe(NO3)3 *9H2O, g | 2.74 | 2.47 | 2.20 | 4.58 | 1.50 |
| Sb2O4, wt % | 7.81 | 7.04 | 7.53 | 7.84 | 8.55 |
| SbCl3, g | 3.86 | 3.48 | 6.21 | 6.46 | 2.11 |
| Promoter, wt % as oxide | 0.57 | 1.49 | 1.69 | 0.53 | 0.56 |
| Salt Formula | Cu(NO3)2* 2.5H2O | Bi(NO3)3*5H2O | Ce(NO3)3* 6H2O | Co(NO3)3* 6H2O | H24Mo7N6O24* 4H2O |
| Grams Salt | 0.55 | 1.04 | 2.36 | 1.40 | 0.23 |
| 28% NH4OH, g | 9.50 | 8.56 | 14.31 | 16.38 | 4.92 |

| | Example 9 | 10 | 11 | 12 |
|---|---|---|---|---|
| Promoter MOx | NiO | SnO2 | V2O5 | ZnO |
| Metal Atom mole Ratios Fe/Sb/M | 1/2.5/1 | 1/2.5/0.35 | 0.5/2.5/0.5 | 1/2.5/0.35 |
| Support | 2% ZrO2/(SiO2 + kaolin) | | | |
| WPV of support, ml/g | 0.6 | | | |
| Grams of Support | 50 | 30 | 50 | 50 |
| Total MOx Loading, wt % | 10 | | | |
| Fe2O3, wt % | 1.48 | 1.54 | 0.85 | 1.62 |
| Fe(NO3)3 b *9H2O, g | 4.16 | 2.60 | 2.39 | 4.56 |
| Sb2O4, wt % | 7.13 | 7.44 | 8.18 | 7.80 |
| SbCl3, g | 5.88 | 3.68 | 6.74 | 6.43 |
| Promoter, wt % as oxide | 1.39 | 1.02 | 0.97 | 0.58 |
| Salt Formula | Ni(NO3)2* 6H2O | SnCl2 | NH4 VO3 | Zn (NO3)2*6H2O |
| Grams Salt | 3.00 | 0.43 | 0.69 | 1.17 |
| 28% NH4OH, g | 17.42 | 9.04 | 12.58 | 15.81 |

WPV denotes the incipient wetness water pore volume of the support.

TABLE 3

Microsphere supports and their properties.

| | Used for Examples | | | | |
|---|---|---|---|---|---|
| | 1-12 | 13, 19-26 | 14 | 15 | 18 |
| Description | SiO2 + Kaolin + SiO2 | SiO2 + Kaolin + SiO2 | Calcined Kaolin | FCC: U.S. Pat. No. 6,656,347 | W/TiO2 + Kaolin + SiO2 |
| Stabilizer | 2% ZrO2 | 9% ZrO2 | | 5% REO | 10% WO3 |
| Incorporated support, wt % | 35 wt % of SiO2 | | 0 | | 57 wt % of W/TiO2 |
| Kaolin wt % | 45 | | 100 | | 29 |
| SiO$_2$ binder wt % | 20 | | 0 | | 14 |
| WPV, g/g | 0.60 | 0.53 | 0.29 | 0.39 | 0.50 |
| ABD, g/g | 0.55 | 0.56 | | | 0.8 |
| BET, m2/gm | 136 | 138 | 8 | | 80 |
| APS, um | | | 74 | | |
| Na2O, VF wt % | | 0.09 | 0.1 | | 0 |
| AL2O3 | 21 | 20 | 45 | | 13 |
| SiO2 | 76 | 69 | 52 | | 34 |
| TiO2 | | 0.6 | | | 47 |
| Fe2O3 | | 0.37 | 1 | | 0.24 |
| ZrO2 | 1.7 | 9.2 | | | 0.01 |
| WO3 | | | | | 5.1 |

ABD denotes the apparent or fall bulk density of the supports.
BET denotes the surface area by the Brunauer, Emmett and Teller method, m$^2$/g.
APS denotes the average particle size by laser scattering, μm.

TABLE 4

Preparation of Fe$_1$Sb$_{2.5}$Cu$_1$ on various support carriers.

| | Example | | | | | |
|---|---|---|---|---|---|---|
| | 13 | 14 | 15 | 16 | 17 | 18 |
| Constituents | Fe/Sb/Cu | Fe/Sb/Cu | Fe/Sb/Cu | Fe/Sb/Cu | Fe/Sb/Cu | Fe/Sb/Cu |
| Atomic Ratios | 1/2.5/1 | 1/2.5/1 | 1/2.5/1 | 1/2.5/1 | 1/2.5/1 | 1/2.5/1 |
| Support | 9% ZrO2/ (SiO2-kaolin) | Calcined kaolin | FCC | Alumina | SOx additive | WO3/TiO2 + kaolin + SiO2 |
| WPV, g/g | 0.60 | 0.29 | 0.34 | 0.50 | 0.40 | 0.50 |
| g of support | 200 | 50 | 50 | 50 | 50 | 50 |
| Total MOx wt % | 10.00 | 10.00 | 10.00 | 10.00 | 10.00 | 10.00 |
| Fe2O3 Wt % | 1.47 | 1.47 | 1.47 | 1.47 | 1.47 | 1.47 |
| Fe(NO3)3*9H2O, g | 16.51 | 4.13 | 4.13 | 4.13 | 4.13 | 4.13 |
| Sb2O4 Wt % | 7.07 | 7.07 | 7.07 | 7.07 | 7.07 | 7.07 |
| SbCl3, g | 23.31 | 5.83 | 5.83 | 5.83 | 5.83 | 5.83 |
| CuO, Wt % | 1.46 | 1.46 | 1.46 | 1.46 | 1.46 | 1.46 |
| Cu(NO3)2 *2.5H2O, g | 9.51 | 2.38 | 2.38 | 2.38 | 2.38 | 2.38 |
| 28% NH4OH, g | 63.94 | 15.99 | 15.99 | 15.99 | 17.26 | 15.99 |

TABLE 5

Preparation details for various Fe/Sb/Cu loadings.

| | Example | | | | | | | |
|---|---|---|---|---|---|---|---|---|
| | 19 | 20 | 21 | 22 | 23 | 24 | 25 | 26 |
| Constituents | blank | Fe/Sb/Cu | Fe/Sb/Cu | Fe/Sb/— | Fe/Sb/— | Fe/Sb/— | Fe/—/Cu | —/Sb/Cu |
| Atomic Ratios | 0/0/0 | 1/2.5/1 | 1/2.5/1 | 1/0.5/0 | 1/2.5/0 | 1/10/0 | 1/0/1 | 0/2.5/1 |
| Catalyst NB# | 19732-1-1c | 19984-48-4 | 19984-48-3 | 19524-50-1c | 19524-50-3c | 19524-50-5c | 19984-48-1 | 19984-48-2 |
| Support | | | | 9% ZrO2/(SiO2-kaolin) | | | | |
| WPV, g/g | 0.60 | 0.60 | 0.60 | 0.60 | 0.60 | 0.60 | 0.60 | 0.60 |
| Support, g | | 50 | 50.00 | 50.00 | 50.0 | 50 | 50.00 | 50.00 |
| Total MOx, wt % | 0.00 | 1.00 | 3.00 | 10.00 | 10.0 | 10 | 2.93 | 8.53 |
| Fe2O4, Wt % | 0 | 0.15 | 0.44 | 5.09 | 1.72 | 0.49 | 1.47 | 0.00 |
| Fe(NO3)3*9H2O, g | 0 | 0.38 | 1.15 | 14.32 | 4.83 | 1.39 | 3.83 | 0.00 |
| Sb2O4, Wt % | 0 | 0.71 | 2.12 | 4.91 | 8.28 | 9.51 | 0.00 | 7.07 |
| SbCl3, g | 0 | 0.53 | 1.62 | 4.04 | 6.82 | 7.84 | 0.00 | 5.73 |
| CuO, Wt % | 0 | 0.15 | 0.44 | 0.00 | 0.00 | 0.00 | 1.46 | 1.46 |

TABLE 5-continued

Preparation details for various Fe/Sb/Cu loadings.

| | Example | | | | | | | |
|---|---|---|---|---|---|---|---|---|
| | 19 | 20 | 21 | 22 | 23 | 24 | 25 | 26 |
| Cu(NO3)2 *2.5H2O, g | | 0.22 | 0.66 | 0.00 | 0.00 | 0.00 | 2.20 | 2.34 |
| 28% NH4OH, g | | 1.10 | 3.38 | 19.97 | 15.73 | 14.19 | 5.93 | 8.18 |

TABLE 6

Performance of FeSb with several promoters using the 2% ZrO2/(SiO2 + Kaolin) support.

| | Test Example | | | | | |
|---|---|---|---|---|---|---|
| | 27 | 28 | 29 | 30 | 31 | 32 |
| Preparation Example | 19 | 1 | 8 | 9 | 10 | 11 |
| Metal oxide loading, wt % | No additive | 1.5Fe/7.1Sb/1.5Cu | 0.9Fe/8.6Sb/0.6Mo | 01.5Fe/7.1Sb/1.4Ni | 1.5Fe/7.4Sb/1.0Sn | 0.9Fe/8.2Sb/1.0V |
| support description | Average of 8 runs | | | 2% ZrO2/(SiO2 + kaolin) | | |
| CO2 | 1820 | 2144 | 1948 | 1886 | 2149 | 1940 |
| CO | 1328 | 1151 | 1355 | 1349 | 1043 | 1231 |
| H2O | 3584 | 3340 | 3175 | 2946 | 3173 | 2723 |
| O2 | 1233 | 1235 | 1285 | 1257 | 1149 | 1244 |
| CO2 + CO | 3148 | 3295 | 3303 | 3234 | 3192 | 3170 |
| 2*N2 | 99.8 | 122.7 | 109.3 | 107.0 | 111.9 | 109.3 |
| HCN | 15.8 | 0.8 | 13.0 | 11.4 | 5.9 | 12.3 |
| NH3 | 11.0 | 0.1 | 5.9 | 8.4 | 1.8 | 0.8 |
| NO | 2.7 | 5.8 | 3.4 | 2.1 | 7.7 | 6.0 |
| NO2 | 1.0 | 0.9 | 1.2 | 1.2 | 1.0 | 1.1 |
| N2O | 0.8 | 0.4 | 0.5 | 1.0 | 1.4 | 1.1 |
| N total | 132 | 131 | 133 | 132 | 131 | 131 |
| SO2 | 18.1 | 17.3 | 16.8 | 16.7 | 16.5 | 15.9 |
| COS | 0.2 | 0.1 | 0.4 | 0.5 | 0.3 | 0.3 |
| K(COP) | | 0.09 | 0.07 | 0.06 | 0.12 | 0.08 |

TABLE 7

Performance of the $Fe_1Sb_{2.5}Cu_1$ formulation on several supports.

| | Test Example | | | | | | |
|---|---|---|---|---|---|---|---|
| | 33 | 48 | 34 | 35 | 36 | 37 | 38 |
| Preparation Example | 13 | 14 | 15 | 16 | 17 | 18 | |
| Metal oxide loadings, wt % | | | 1.5Fe/7.1Sb/1.5Cu | | | | |
| support description | 9% ZrO2/ (SiO2+kaolin) | Kaolin | 6,656,347 FCC | Alumina | SOx additive | WO3/TiO2 + kaolin + SiO2 | |
| CO2 | 1988 | 1964 | 1899 | 1911 | 2084 | 2415 | 2191 |
| CO | 1224 | 1060 | 1329 | 1212 | 904 | 550 | 779 |
| H2O | 3399 | 3223 | 3189 | 3108 | 3191 | 3090 | 3456 |
| O2 | 1343 | 1211 | 1295 | 1265 | 1174 | 1154 | 1159 |
| CO2 + CO | 3212 | 3024 | 3227 | 3123 | 2988 | 2964 | 2969 |
| 2*N2 | 118 | 121 | 114 | 118 | 115 | 98 | 82 |
| HCN | 1.1 | 0.5 | 1.5 | 0.3 | 0.2 | 0.7 | 0.3 |
| NH3 | 6.0 | 1.6 | 8.4 | 6.1 | 7.7 | 0.0 | 0.0 |
| NO | 6.1 | 6.0 | 3.0 | 3.1 | 4.9 | 29.9 | 45.4 |
| NO2 | 1.1 | 0.2 | 1.0 | 1.0 | 0.9 | 1.0 | 1.0 |
| N2O | 1.8 | 0.7 | 1.3 | 0.9 | 0.7 | 0.4 | 0.9 |
| N total | 136 | 131 | 131 | 131 | 131 | 131 | 131 |
| SO2 | 17.7 | 17.8 | 18.2 | 17.7 | 17.3 | 16.0 | 17.0 |
| COS | 0.3 | 0.1 | 0.3 | 0.3 | 0.3 | 0.1 | 0.4 |
| K(COP) | 0.08 | 0.11 | 0.05 | 0.08 | 0.13 | 0.27 | 0.16 |

TABLE 8

Test results for FeSbCu at various combinations of loadings.

| | Test Example | | | | |
|---|---|---|---|---|---|
| | 39 | 40 | 41 | 42 | 43 |
| Preparation Example | 19 | 20 | 20 | 21 | 22 |
| Metal oxide loadings, wt % | 0Fe/0Sb/0Cu | 0.15Fe/0.71Sb/0.15Cu | 0.15Fe/0.71Sb/0.15Cu | 0.4Fe/2.1Sb/0.4Cu | 5.0Fe/5.0Sb |
| support description | | | 9% ZrO2/(SiO2 + kaolin) | | |
| for Grams additive | 0.4 | 4 | 4 | 1.32 | 0.4 |
| CO2 | 1824 | 1863 | 1820 | 1804 | 1904 |
| CO | 1266 | 1257 | 1284 | 1291 | 1225 |
| H2O | 3490 | 3522 | 3066 | 3476 | 3572 |
| O2 | 1267 | 1236 | 1296 | 1287 | 1269 |
| CO2 + CO | 3089 | 3120 | 3104 | 3095 | 3129 |
| 2*N2 | 106.3 | 106.6 | 106.6 | 107.3 | 105.8 |
| HCN | 6.3 | 10.0 | 10.9 | 6.1 | 8.9 |
| NH3 | 11.2 | 9.0 | 8.4 | 12.9 | 6.2 |
| NO | 3.5 | 2.5 | 2.5 | 3.2 | 5.8 |
| NO2 | 0.5 | 0.9 | 0.6 | 0.9 | 1.1 |
| N2O | 1.8 | 1.1 | 1.4 | 1.2 | 2.1 |
| N total | 131 | 131 | 131 | 132 | 131 |
| SO2 | 18.5 | 18.8 | 17.6 | 18.4 | 18.3 |
| COS | 0.6 | 0.2 | 0.5 | 0.3 | 0.3 |
| K(COP) | 0.07 | 0.01 | 0.01 | 0.02 | 0.08 |

| | Test Example | | | |
|---|---|---|---|---|
| | 44 | 45 | 46 | 47 |
| Preparation Example | 23 | 24 | 25 | 26 |
| Metal oxide loadings, wt % | 2Fe/9Sb | 0.5Fe/9Sb | 1.5Fe/1.5Cu | 7.1Sb/1.5Cu |
| support description | | 9% ZrO2/(SiO2 + kaolin) | | |
| for Grams additive | 0.36 | 0.4 | 0.4 | 0.4 |
| CO2 | 1836 | 1703 | 1917 | 2025 |
| CO | 1298 | 1450 | 1194 | 1114 |
| H2O | 3523 | 3110 | 3496 | 3287 |
| O2 | 1218 | 1277 | 1645 | 1167 |
| CO2 + CO | 3133 | 3153 | 3111 | 3139 |
| 2*N2 | 106.2 | 95.4 | 114.8 | 94.1 |
| HCN | 9.5 | 16.5 | 5.4 | 0.8 |
| NH3 | 7.1 | 12.3 | 7.1 | 0.0 |
| NO | 3.9 | 2.7 | 3.4 | 33.6 |
| NO2 | 0.8 | 0.6 | 0.9 | 0.6 |
| N2O | 1.9 | 2.0 | 1.3 | 1.0 |
| N total | 131 | 131 | 134 | 131 |
| SO2 | 18.1 | 18.2 | 18.3 | 16.5 |
| COS | 0.3 | 0.4 | 0.3 | 0.3 |
| K(COP) | 0.08 | 0.02 | 0.09 | 0.12 |

TABLE 9

Test results for Examples 13-16.

| | Test Example | | | | | | | | | | | |
|---|---|---|---|---|---|---|---|---|---|---|---|---|
| | 49 | 50 | 51 | 52 | 53 | 54 | 55 | 56 | 57 | 58 | 59 | 60 |
| Preparation Example | 13 | | | | 14 | | | 15 | | | 16 | |
| Oxide loadings, Wt % | | | | | | 1.5Fe/7.1Sb/1.5Cu | | | | | | |
| Support | 9% ZrO$_2$/(SiO$_2$ + kaolin) | | | | Kaolin | | | From Pat. No. 6,656,347 | | | Alumina | |
| Pretreatment | Fresh | Blend | Steamed | Fresh | Blend | Steamed | Fresh | Blend | Steamed | Fresh | Blend | Steamed |
| CO$_2$ | 2043 | 1964 | 1752 | 2029 | 1856 | 1857 | 2014 | 1809 | 1792 | 2378 | 2084 | 2227 |
| CO | 951 | 1060 | 1115 | 862 | 1074 | 1043 | 978 | 1118 | 1165 | 387 | 904 | 638 |
| H$_2$O | 3344 | 3223 | 2875 | 2972 | 2828 | 2970 | 2975 | 2972 | 3364 | 2758 | 3191 | 3407 |
| O$_2$ | 1195 | 1211 | 2477 | 1172 | 1214 | 1172 | 1200 | 1207 | 1224 | 1194 | 1310 | |
| CO$_2$ + CO | 2994 | 3024 | 2868 | 2891 | 2930 | 2900 | 2992 | 2927 | 2957 | 2765 | 2989 | 2865 |
| 2*N$_2$ | 119.5 | 121.4 | 110.8 | 106.6 | 125.9 | 116.0 | 124.4 | 124.1 | 111.4 | 101.0 | 115.8 | 121.1 |
| HCN | 0.3 | 0.5 | 9.3 | 0.6 | 1.0 | 3.0 | 0.6 | 0.9 | 7.2 | 1.0 | 0.2 | 0.4 |
| NH$_3$ | 1.7 | 1.6 | 6.1 | 0.0 | 0.1 | 5.0 | 0.0 | 0.5 | 8.9 | 0.0 | 7.7 | 2.8 |
| NO | 8.9 | 6.0 | 4.0 | 22.8 | 2.8 | 4.6 | 4.9 | 3.9 | 3.0 | 28.7 | 4.9 | 7.8 |
| NO$_2$ | 0.3 | 0.2 | 0.4 | 0.4 | 0.4 | 0.5 | 0.3 | 0.3 | 0.3 | 0.3 | 0.9 | 0.3 |
| N$_2$O | 0.5 | 0.7 | 0.6 | 0.2 | 0.3 | 1.0 | 0.4 | 0.5 | 0.4 | 0.3 | 0.7 | 0.2 |
| N total | 132 | 131 | 132 | 131 | 131 | 131 | 131 | 131 | 132 | 132 | 131 | 133 |
| SO$_2$ | 18.3 | 17.8 | 16.9 | 17.0 | 16.3 | 17.1 | 17.4 | 16.9 | 18.1 | 17.1 | 17.3 | 17.9 |

TABLE 9-continued

Test results for Examples 13-16.

| | Test Example | | | | | | | | | | | |
|---|---|---|---|---|---|---|---|---|---|---|---|---|
| | 49 | 50 | 51 | 52 | 53 | 54 | 55 | 56 | 57 | 58 | 59 | 60 |
| COS | 0.2 | 0.1 | 0.0 | 0.2 | 0.2 | 0.1 | 0.1 | 0.2 | 0.1 | 0.1 | 0.3 | 0.0 |
| k(COP) | 0.13 | 0.11 | 0.08 | 0.13 | 0.09 | 0.12 | 0.09 | 0.07 | 0.07 | 0.66 | 0.13 | 0.22 |

What is claimed is:

1. A process for regenerating FCC catalysts in an FCC regenerator for reducing coke content of the FCC catalyst with a reduced amount of NOx, or NOx precursor emissions in the FCC regenerator flue gas subsequent to FCC cracking of a hydrocarbon feedstock, comprising directing an FCC catalyst from a catalytic cracking zone to an FCC regenerator to reduce said coke content on said FCC catalyst and adding an ammoxidation catalyst composition to said FCC regenerator.

2. The process of claim 1, wherein the catalyst composition comprises:
    a metal additive of FeSbM, wherein M is optional and selected from Mg, Mn, Mo, Ni, Sn, V and Cu, and a support carrier for said metal additive.

3. The process of claim 2, wherein M is Cu.

4. The process of claim 2, wherein the metal additive comprises $Fe_2O_3$, $Sb_2O_3$ and CuO in amounts which result in an atomic ratio of Fe to Sb to Cu of 0.1-10 to 0.1-10 to 0-10.

5. The process of claim 4, wherein the atomic ratio of Fe to Sb to Cu is about 1 to 2.5 to 1.

6. The process of claim 2, wherein the ammoxidation catalyst composition comprises about 5 to 15 wt. % of the metal additive as oxide.

7. The process of claim 2, wherein the support carrier is selected from one or more of i) in-situ zeolite, ii) calcined kaolin, iii) alumina, and iv) $SiO_2$.

8. The process of claim 7, wherein the $SiO_2$ is Zr-stabilized.

9. The process of claim 7, wherein the support carrier comprises an in-situ zeolite.

10. The process of claim 1, wherein the ammoxidation catalyst composition is mixed with fresh and/or regenerated FCC catalyst.

11. The process of claim 10, wherein the composition is less than about 5 wt. % of the weight of fresh and/or regenerated FCC catalyst.

12. The process of claim 11, wherein the composition is about 2% of the weight of fresh and/or regenerated FCC catalyst.

13. In a process for cracking a hydrocarbon feed in a catalytic cracking zone in the presence of an FCC catalyst and regenerating said FCC catalyst in a regenerator, the improvement comprising directing said FCC catalyst to said regenerator to reduce coke content thereon and reducing amounts of NOx, or NOx precursor emissions in the regenerator flue gas by directing an ammoxidation catalyst composition to the regenerator.

14. The improvement of claim 13 wherein said ammoxidation catalyst comprises:
    a metal additive of FeSbM, wherein M is optional and selected from Mg, Mn, Mo, Ni, Sn, V and Cu.

15. The process of claim 14, wherein M is Cu.

16. The process of claim 13 wherein said ammoxidation catalyst is a separate particle from said FCC catalyst, or integrated with said FCC catalyst.

17. The process of claim 13, wherein the ammoxidation catalyst composition is mixed with fresh or regenerated FCC catalyst prior to the FCC catalyst being directed to the cracking zone.

18. A NOx emission reduction catalyst composition consisting essentially of:
    a metal additive of FeSbM, wherein M is selected from Mg, Mn, Mo, Ni, Sn, V and Cu, and a metal oxide support carrier containing said metal additive, wherein the metal additive comprises 5 to 15 wt % as oxide of said catalyst.

19. The composition of claim 18, wherein M is Cu.

* * * * *